Oct. 14, 1958  A. M. THOMAS  2,855,885
AMPHIBIOUS VEHICLE
Filed June 18, 1956  3 Sheets-Sheet 1
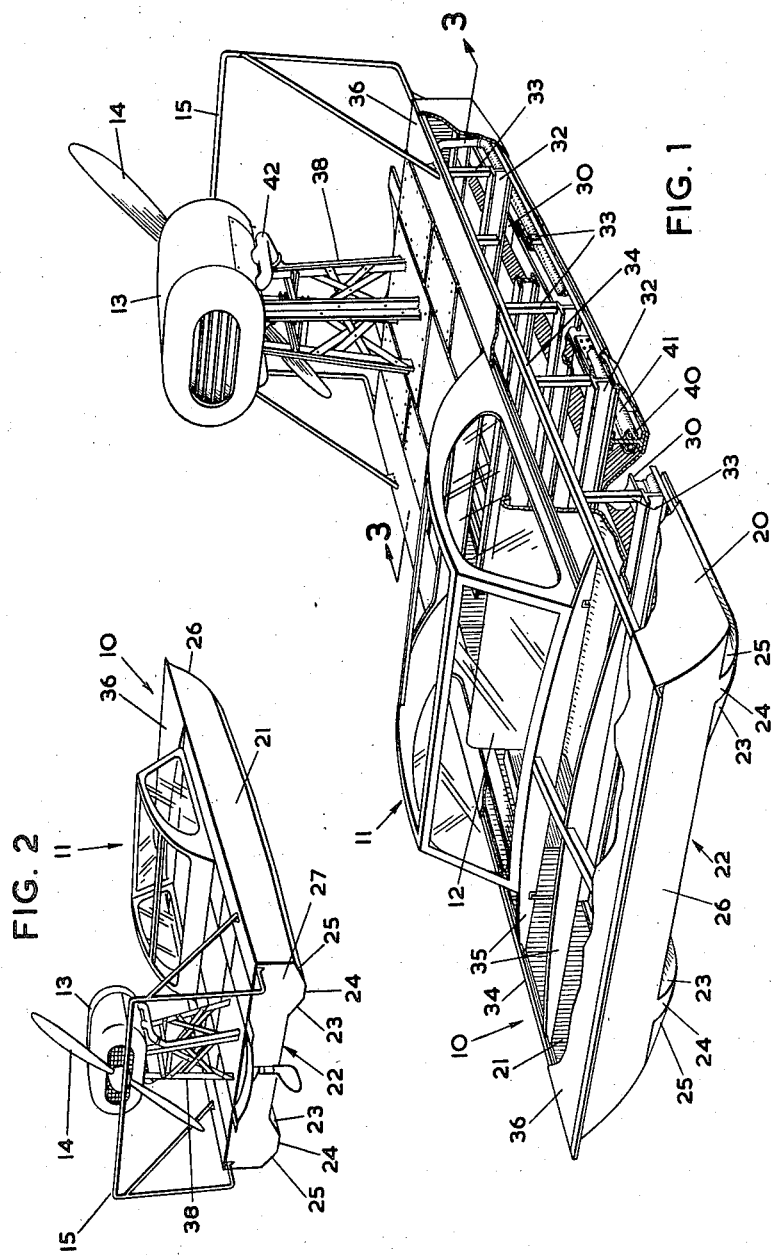
INVENTOR
ALAN MILLER THOMAS
BY: Maybee & Legris
ATTORNEYS Oct. 14, 1958     A. M. THOMAS     2,855,885
AMPHIBIOUS VEHICLE
Filed June 18, 1956     3 Sheets-Sheet 2
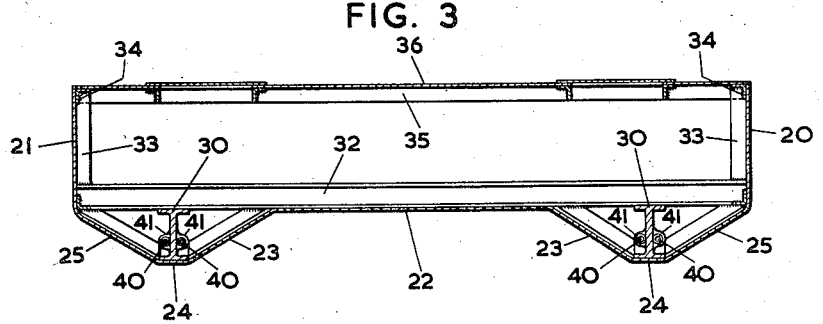
FIG. 3
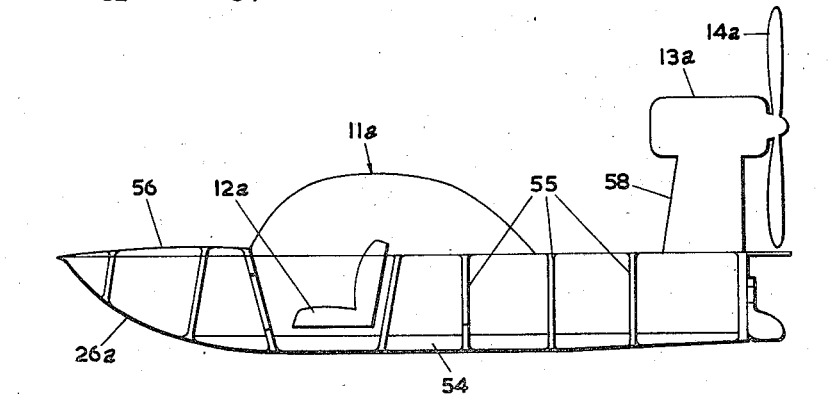
FIG. 6
FIG. 7
INVENTOR
ALAN MILLER THOMAS
BY: Maybee & Legris
ATTORNEYS Oct. 14, 1958 A. M. THOMAS 2,855,885
AMPHIBIOUS VEHICLE
Filed June 18, 1956 3 Sheets-Sheet 3
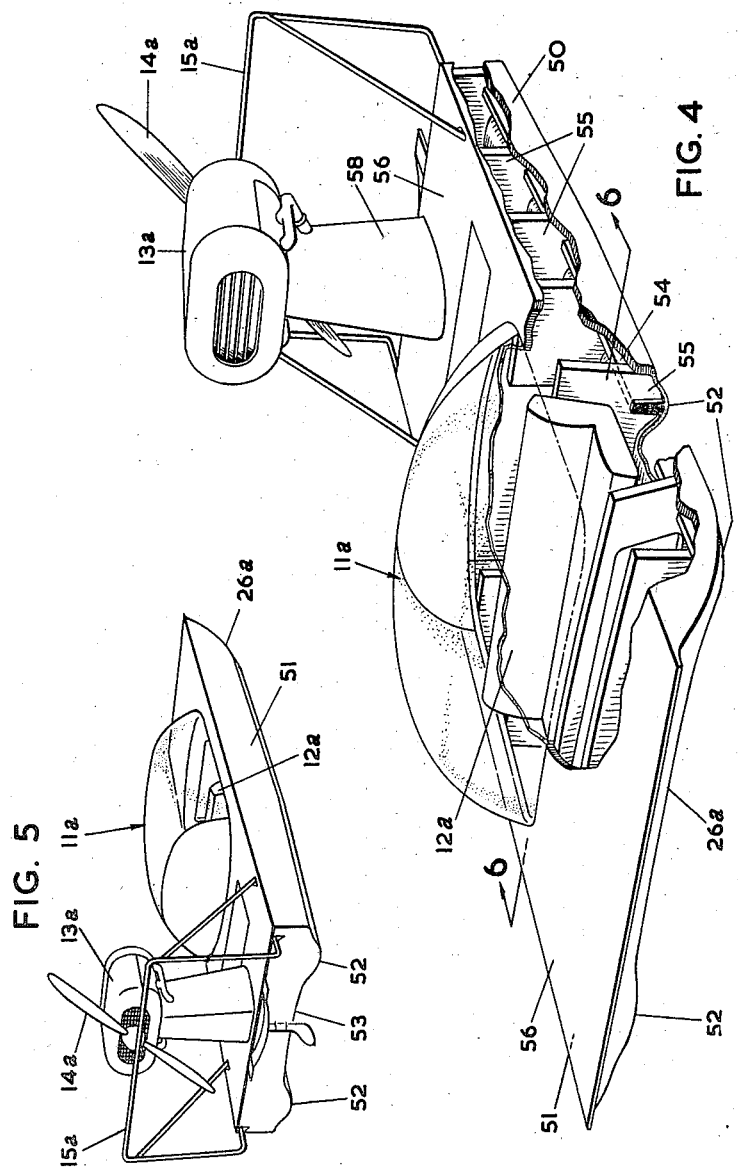
INVENTOR
ALAN MILLER THOMAS
BY: Maybee & Legris
ATTORNEYS

United States Patent Office 2,855,885
Patented Oct. 14, 1958

2,855,885

AMPHIBIOUS VEHICLE

Alan Miller Thomas, Toronto, Ontario, Canada, assignor to Winter Hydrocraft Ltd., Toronto, Ontario, Canada, a corporation Application June 18, 1956, Serial No. 592,092

10 Claims. (Cl. 114—43)

This invention relates to a "scoot," by which term is meant an amphibious power driven vehicle which can be used alternatively as a boat, or as a sleigh for traversing over snow or ice. Usually, the scoot is moved across the water, ice or snow by means of a propeller driven by a prime mover in the manner of a hydroplane, but it may be driven by any convenient prime mover, for example, a pulse jet or jet propulsion engine.

The main object of the invention is to provide a hull for a scoot which is of light weight construction and which is torsionally rigid.

A further object of the invention is to reduce drag on the hull and mitigate the possibility of accretions of ice building up on runners of the scoot.

A still further object of the invention is to provide means for freeing the scoot should it become frozen to ice or snow upon which it is standing.

A still further object of the invention is to provide a hull for a scoot in which the possibility of the scoot sinking, should the hull be perforated by an obstruction or missile, is mitigated.

According to the invention, the hull for a scoot includes, when viewed in transverse cross-section, a skin defining side walls and a bottom wall of the hull, portions of the skin extending below the bottom wall to define runners extending longitudinally of the hull, and a plurality of reinforcing members extending transversely of the hull at longitudinally spaced intervals and secured to the skin.

According to a further feature of the invention, the hull for a scoot includes, when viewed in transverse cross-section, a skin defining side walls and a bottom wall of the hull, portions of the skin extending below the bottom wall to define runners extending longitudinally of the hull, a reinforcing member within each of the downwardly extending portions and extending longitudinally of the hull, a conduit associated with each reinforcing member and through which a heated fluid can be passed and a plurality of reinforcing members extending transversely of the hull at longitudinally spaced intervals and secured to the skin and the longitudinally extending reinforcing members.

According to a still further feature of the invention, the hull for a scoot includes, when viewed in transverse cross-section, a skin defining side walls and a bottom wall of the hull, portions of the skin extending below the bottom wall to define runners extending longitudinally of the hull, and a plurality of bulkheads extending transversely of the hull at longitudinally spaced intervals and secured to the skin.

The foregoing and still further objects and advantages of the invention will become apparent from a study of the following specification, taken in conjunction with the accompany drawings, in which like reference characters indicate corresponding parts throughout the several views, and in which:

Figure 1 is a fragmentary perspective view of one form of the scoot;

Figure 2 is a rear perspective view of the scoot shown in Figure 1;

Figure 3 is a cross-section taken on the line 3—3 of Figure 1, portions lying behind the section being omitted;

Figure 4 is a fragmentary perspective view of another form of the scoot according to the invention;

Figure 5 is a perspective view taken from the rear of Figure 4;

Figure 6 is a cross-section taken on the line 6—6 of Figure 4, portions lying behind the section being omitted; and Figure 7 is a diagrammatic side elevation of the scoot shown in Figures 4 to 6.

Referring to Figures 1 to 3, the scoot includes a hull, indicated generally at 10, a passenger compartment, indicated generally at 11 in which is a seat 12, a prime mover 13, for example, a diesel engine, driving a propeller 14, and a guard 15 for the propeller.

The hull, as will be seen more clearly from Figures 1 and 3, is formed by a skin providing vertical side walls 20, 21, and a substantially horizontal bottom wall 22. At each longitudinal edge of the bottom wall 22 the skin extends downwardly at 23 and then extends horizontally at 24 to an upwardly extending portion 25 which continues into the side wall 20 or 21. When the scoot is in use on snow or ice, it is the portions 24 which form the runners or skis for the scoot, the portions 23, 25 providing additional support should the scoot be operating on soft snow. The runner portions 23 to 25 extend longitudinally of the hull from the trailing end thereof to an upwardly inclined nose portion 26, the rear wall of the hull being provided by a substantially vertical sheet metal wall 27.

Extending longitudinally of the hull and within each of the runner portions 23, 24, 25 is an "I" section beam 30 which is secured to the runner portion 24, the beams 30 forming reinforcing members for the runners. The portions 24 and the beams 30 may be secured together in any convenient manner, and, if desired, gusset plates may be provided extending between beams and the portions 23 and 25 to provide additional reinforcement.

Positioned on top of the beams 30 and spaced at intervals longitudinally of the hull, are a plurality of "I" section beams 32, the lower flanges of which are secured to the beams 30 and the bottom wall 22 in any convenient manner. The purpose of the beams 32 is to reinforce the hull in a transverse direction, and, in conjunction with the beams 30, to increase the torsional rigidity of the hull.

At each end of the beams 32, and to their upper flanges, is secured a stanchion 33 to which the side walls 20 or 21 are secured, the stanchions being tied together at their upper ends by members 34 which extend longitudinally of the hull and which are secured to the top edges of the side walls. Extending transversely of the hull and supported by the members 34 are a plurality of spars 35 to which an upper skin 36 forming decking for the hull may be secured.

The prime mover 13 is suported by stanchions 38 which extend through the top wall of the hull and are secured at their lower ends to the beams 32.

The hull is constructed from a light weight metal or metal alloy, the interconnection of the various elements being effected preferably by welding.

Attached to each side of the webs of the beams 30 is a heat conductive conduit 40, the conduits being provided with a lagging 41, for example, of rock wool. The conduits 40 are connected to an exhaust manifold 42 of the prime mover and convey the hot exhaust gases along the beams 30, the gases transferring their heat to the beams 30 and thus to the runners portions 24 to free the scoot should it have become frozen to ice or snow upon which it is standing. The heat is also effectively conveyed to the runner portions 23 and 25 to free snow or ice which may have adhered to those portions.

Referring now to Figures 4 to 7, it will be seen that the scoot has the same general external appearance, with the exception that the runners, which in the previous construction were substantially frusto-pyramidical, are in this construction smoothly curved. The hull of the scoot is of the same basic design, but its specific construction is modified in view of the differences in the materials used in the construction, the materials used being mainly resin bonded glass fibre or like material.

The hull of the scoot is formed by an outer skin providing side walls 50, 51 which merge through smoothly curved portions 52 with a substantially horizontally extending bottom wall 53, the curved portions 52 extending from the rear of the hull to an upwardly inclined nose portion 26a thereof and forming runners.

Extending longitudinally of the hull within each of the curved portions 52 is a beam 54, the beams being fabricated with, or fused to, the curved portions and constituting reinforcing members for the curved portions.

Extending transversely of the hull are a plurality of bulkheads 55, some of which may be cut away to accommodate the passengers, fuel tank, etc., and the bulkheads are formed integral with, or fused to the side walls 50, 51, bottom wall 53, the curved portions 52 and the beams 54, and form reinforcing members for the hull. As will be seen from Figure 7 of the drawings, the bulkheads are arranged to form a plurality of boxed in sections of the hull, the hull being closed in by decking 56 which is secured to the side walls and the bulkheads.

Secured to the ends of the bulkheads and to the side walls 50, 51 are slabs of cellular material 57, the slabs 57 in effect forming continuous beams extending longitudinally of the hull.

The scoot is provided with a passenger compartment 11a in which is a seat 12a, a prime mover 13a driving a propeller 14a and a propeller guard 15a, the prime mover being supported by stanchions within a fairing 58.

The side walls 50 and 51 are preferably formed from two plys of resin impregnated glass cloth, the number of plys increasing to ten at the curved portions 52 and the bottom wall wall 53; the beams 54 are formed from bunches of resin impregnated glass fibre roving, and the bulkheads are formed from five or more plys of resin impregnated glass cloth. The slabs 57 are preferably formed from resin impregnated fibrous material, for example, wood fibre, which, when viewed in a direction transversely of the hull presents a honeycomb structure having ¾ inch cells. The hull, when fabricated in this manner provides a structure of great strength and torsional rigidity.

If desired, heating means similar to that shown in Figure 1 may be provided for the beams 54.

The bulkheads 55 divide the hull up into a plurality of water-tight compartments, and are preferably arranged so that should any two bulkheads be punctured the scoot will still have sufficient buoyancy to float.

It will be seen that by the invention a scoot is being provided which is of relatively simple design and which is light in weight and torsionally rigid. Also, a scoot has been provided in which the possibility of accretions of ice or snow building up on the runners is mitigated, due to the fact that the runners do not present a re-entrant surface and are not supported by structural members which project from the underside of the hull, and also due to the provision for heating the runners.

It is to be understood that the forms of the invention herewith shown and described are to be taken as preferred examples of the same, and that various changes in the shape, size and arrangement of the parts may be resorted to without departing from the spirit of the invention or the scope of the subjoined claims.

What I claim as my invention is:

1. A hull for a scoot, the hull including a continuous outer skin, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly extending fourth transitional portion into an upwardly extending portion providing a second substantially vertical side wall of the hull, and a plurality of reinforcing members secured to that portion of the skin providing the bottom wall and extending transversely of the interior of the hull at longitudinally spaced intervals.

2. A hull for a scoot, the hull including a continuous outer skin, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly-extending fourth transitional portion into an upwardly extending portion providing a second substantially vertical side wall of the hull, reinforcing members extending longitudinally of the hull and positioned between the first and second transitional portion and the third and fourth transitional portion, respectively, the longitudinal reinforcing members being secured to those portions of the skin providing the first and second runners, and a plurality of reinforcing members secured to that portion of the skin providing the bottom wall and extending transversely of the hull at longitudinally spaced intervals.

3. A hull for a scoot, the hull including a continuous outer skin, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly-extending fourth transitional portion into an upwardly-extending portion providing a second substantially vertical side wall of the hull, reinforcing members extending longitudinally of the hull and positioned between the first and second transitional portion and the third and fourth transitional portion, respectively, the longitudinal reinforcing members being secured to those portions of the skin providing the first and second runners, a conduit extending longitudinally of each reinforcing member and arranged in intimate thermal-transfer contact therewith, means for supplying a heated fluid to said conduit, and a plurality of reinforcing members secured to that portion of the skin providing the bottom wall and extending transversely of the interior of the hull at longitudinally spaced intervals.

4. A hull for a scoot according to claim 3, in which the skin, the longitudinal reinforcing members, and the transverse reinforcing members are each formed of a light weight metal alloy.

5. A hull for a scoot, the hull including a continuous sheet metal skin which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner for the scoot, and then merging through an upwardly extending fourth transitional portion into an upwardly extending portion providing a second substantially vertical side wall of the hull, reinforcing members formed from a metal of good thermal conductivity and extending longitudinally of the hull, the longitudinal reinforcing members being positioned between the first and second transitional portion and the third and fourth transitional portion, respectively, and being secured to those portions of the skin providing the first and second runners, a conduit extending longitudinally of each reinforcing member and arranged in intimate thermal-transfer contact therewith, means for supplying a heated fluid to said conduits, a plurality of reinforcing members secured to that portion of the skin providing the bottom wall and extending transversely of the interior of the hull at longitudinally spaced intervals, stanchions extending upwardly from the ends of the transverse reinforcing members and secured to the side walls, tie members extending longitudinally of the hull and secured to the side walls and to the upper ends of the stanchions, spars extending transversely of the hull and secured to the longitudinally extending tie members, and a sheet metal skin secured to the spars and to the longitudinally extending tie members to provide a decking for the hull.

6. A hull for a scoot, the hull including a continuous outer skin, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly extending fourth transitional portion into an upwardly extending portion providing a second substantially vertical side wall of the hull, and a plurality of bulkheads secured to that portion of the skin which provides the bottom wall and extending transversely of the interior of the hull at longitudinally spaced intervals.

7. A hull for a scoot, the hull including a continuous outer skin, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly-extending fourth transitional portion into an upwardly extending portion providing a second substantially vertical side wall of the hull, reinforcing members extending longitudinally of the hull and positioned between the first and second transitional portion and the third and fourth transitional portion, respectively, the longitudinal reinforcing members being secured to that portion of the skin providing the first and second runners, and a plurality of bulkheads secured to that portion of the skin providing the bottom wall and extending transversely of the hull at longitudinally spaced intervals.

8. A hull for a scoot, the hull including a continuous outer skin, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly-extending fourth transitional portion into an upwardly-extending portion providing a second substantially vertical side wall of the hull, reinforcing members extending longitudinally of the hull and positioned between the first and second transitional portion and the third and fourth transitional portion, respectively, the longitudinal reinforcing members being secured to those portions of the skin providing the first and second runners, a conduit extending longitudinally of each reinforcing member and arranged in intimate thermal transfer contact therewith, means for supplying a heated fluid to said conduit, and a plurality of bulkheads secured to that portion of the skin providing the bottom wall and extending transversely of the interior of the hull at longitudinally spaced intervals.

9. A hull for a scoot according to claim 8, in which the skin is formed from lamination of resin impregnated glass fibre cloth, and in which the longitudinal reinforcing members are formed from resin impregnated glass fibre roving.

10. A hull for a scoot, the hull including a continuous outer skin formed from a resin impregnated laminated glass fibre cloth, which, when the hull is viewed in transverse cross-section, provides a first substantially vertical side wall of the hull merging at its lower longitudinal edge through a first transitional portion into a portion extending transversely and longitudinally of the hull and providing a first runner of the scoot, then merging through an upwardly-extending second transitional portion into a portion extending transversely and longitudinally of the hull and providing a bottom wall of the scoot, then merging through a downwardly extending third transitional portion into a portion extending longitudinally and transversely of the hull and providing a second runner of the scoot, and then merging through an upwardly-extending fourth transitional portion into an upwardly extending portion providing a second substantially vertical side wall of the hull, reinforcing members formed from a resin impregnated glass fibre roving extending longitudinally of the hull and positioned between the first and second transitional portion and the third and fourth transitional portion, respectively, the longitudinal reinforcing members being bonded to those portions of the skin providing the first and second runners, a plurality of bulk heads formed from resin impregnated laminated glass fibre cloth bonded to the skin and to the longitudinal reinforcing members and extending transversely of the interior of the hull at longitudinally spaced intervals, slabs of resin impregnated cellular fibrous material secured to the side walls and the bulkhead and forming with the bulkhead continuous beams extending longitudinally of the hull, and a resin impregnated glass fibre cloth skin secured to the bulkheads and the slabs and providing a decking for the hull.

References Cited in the file of this patent

UNITED STATES PATENTS

| | | |
|---|---|---|
| 594,658 | Scott | Nov. 30, 1897 |
| 859,693 | Roe | July 9, 1907 |
| 861,607 | Pfeifer | July 30, 1907 |
| 1,693,773 | Anderson | Dec. 4, 1928 |
| 1,816,118 | Knight | July 28, 1931 |
| 2,564,587 | Sundstedt | Aug. 19, 1951 |
| 2,709,979 | Bush et al. | Jan. 7, 1955 |